(12) United States Patent
Shimizu et al.

(10) Patent No.: US 7,245,571 B2
(45) Date of Patent: Jul. 17, 2007

(54) OPTICAL DISK DRIVE THAT CAN ADJUST ERASE POWER DURING WRITING OPERATION

(75) Inventors: Toshiki Shimizu, Nishi-Tokyo (JP); Akira Mashimo, Tokorozawa (JP)

(73) Assignee: TEAC Corporation (JP)

( * ) Notice: Subject to any disclaimer, the term of this patent is extended or adjusted under 35 U.S.C. 154(b) by 402 days.

(21) Appl. No.: 10/153,506

(22) Filed: May 21, 2002

(65) Prior Publication Data
US 2002/0172114 A1 Nov. 21, 2002

(30) Foreign Application Priority Data
May 21, 2001 (JP) ............................. 2001-151482
Apr. 11, 2002 (JP) ............................. 2002-109820

(51) Int. Cl.
*G11B 7/006* (2006.01)
(52) U.S. Cl. ................................ 369/47.53; 369/53.21
(58) Field of Classification Search ............ 369/47.53, 369/47.5, 53.1, 116; G11B 5/00, 5/125, 5/09, G11B 7/006
See application file for complete search history.

(56) References Cited

U.S. PATENT DOCUMENTS

| 5,475,666 | A | * | 12/1995 | Ito et al. ................. 369/47.52 |
| 5,559,785 | A | * | 9/1996 | Honda et al. ............. 369/59.12 |
| 5,872,763 | A | * | 2/1999 | Osakabe ................... 369/47.53 |
| 5,949,747 | A | * | 9/1999 | Miyashita et al. ........ 369/53.26 |
| 6,246,641 | B1 | * | 6/2001 | Miyaoka ................... 369/13.05 |
| 6,320,832 | B1 | * | 11/2001 | Nakao et al. ............. 369/47.53 |
| 6,687,207 | B2 | * | 2/2004 | Fukuchi et al. ............ 369/53.2 |
| 6,711,108 | B2 | * | 3/2004 | Mashimo et al. ......... 369/47.53 |
| 6,778,478 | B2 | * | 8/2004 | Mashimo et al. ......... 369/47.53 |

FOREIGN PATENT DOCUMENTS

| JP | 2001-101661 | 4/2001 |
| JP | 2001-351249 | * 12/2001 |

OTHER PUBLICATIONS

MAT (Machine assisted translation—specification only) of JP 2001-351249.*

* cited by examiner

*Primary Examiner*—Aristotelis M Psitos
(74) *Attorney, Agent, or Firm*—Anderson Kill & Olick, PC

(57) ABSTRACT

An optical disk drive that can automatically adjust an erase power to an appropriate level to keep the error rate low and not to shorten the life of an erasable optical disk. The optical disk drive obtains a reference erasing modulation factor using a test area of the erasable optical disk when the disk is set. While overwriting data in the erasable optical disk, the optical disk drive obtains an erasing modulation factor based on the read signal detected in an erased region from time to time to adjust the erase power so that the erase power continually adjusted to the appropriate level.

4 Claims, 12 Drawing Sheets

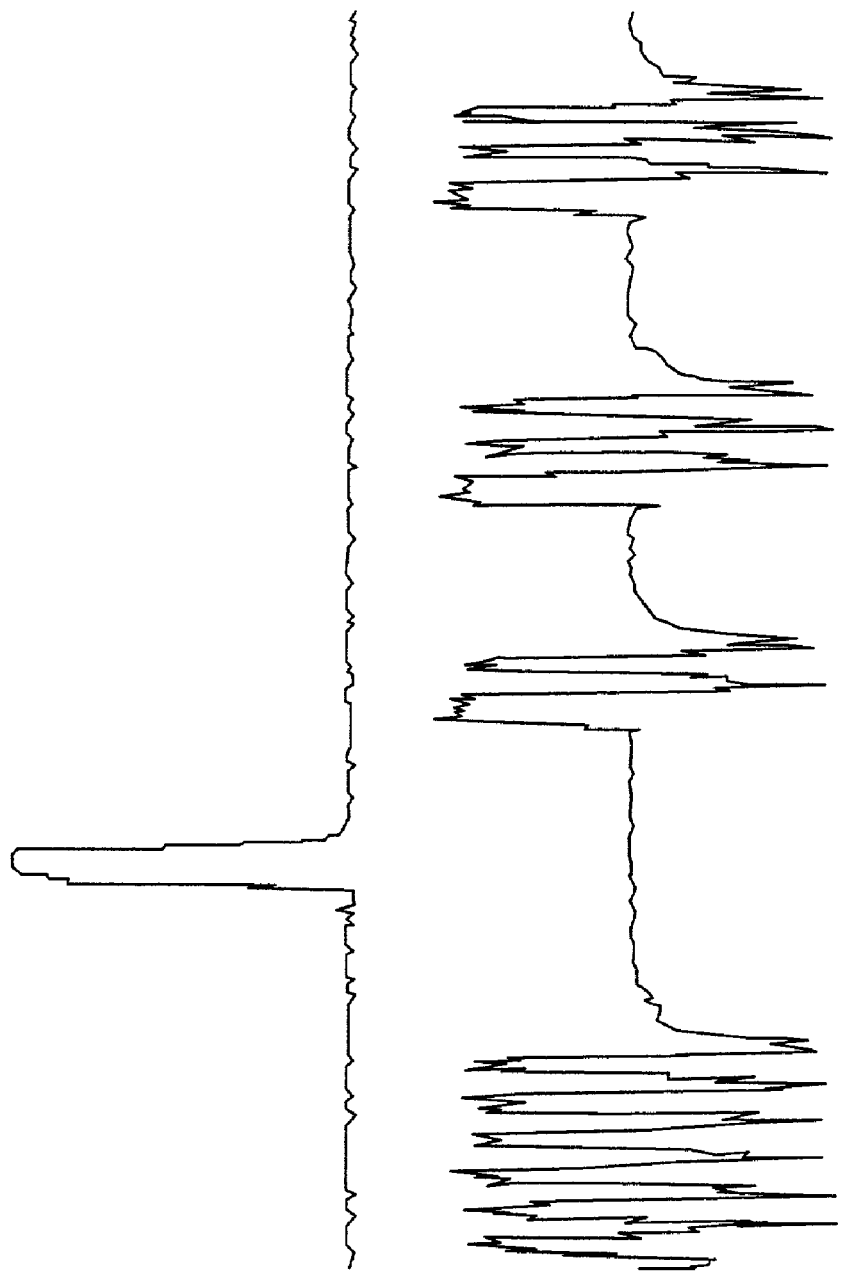

OPTICAL DISK DRIVE THAT CAN ADJUST ERASE POWER DURING WRITING OPERATION

BACKGROUND OF THE INVENTION

1. Field of the Invention

The present invention relates to an optical disk drive, and more particularly, to an optical disk drive that writes data in an erasable optical disk.

2. Description of the Related Art

As a recordable optical disk, write once types such as CD-R and erasable types such as CD-RW are available. In order to overwrite data in an erasable type optical disk, a laser beam of which laser power changes in two steps, a write power Pw and an erase power Pe, is used. In this case, the recording layer of the optical disk is turned from a crystal state to an amorphous state by the laser beam of the write power Pw to form a recording mark, and the recording layer of the optical disk is turned from an amorphous state to a crystal state by the laser beam of the erase power Pe to erase the recording mark.

In the case of writing in an optical disk, the optimum write power Pwo and the optimum erase power Peo of the laser beam depend on the kind of the optical disk, the optical disk drive, and the recording speed. Accordingly, in order to set the optimum write power Pwo and the optimum erase power Peo that suit the combination of the kind of the optical disk, the optical disk drive, and the recording speed, a write power calibration operation called Optimum Power Control (OPC) is performed before the writing of data.

The conventional OPC operation of an erasable optical disk drive will be described below. On a recording face of the optical disk, as shown in FIG. 6, a data area to store various data therein and a power calibration area (PCA) that is a test writing region to set the optimum write power of the laser beam are provided. The PCA is provided at the most inner radius of the disk. The PCA consists of a test area and a count area. The test area is divided into 100 partitions, each partition consisting of 15 frames. One OPC operation is performed using one of the 100 partitions. A test signal of which laser power changes in 15 steps is recorded in 15 frames in a partition, each frame being recorded using one step of laser power. This test signal is an EFM modulated signal of a series of pulses having a time width of 3-11 times of a reference time width T (T=230 nsec, a cycle frequency of 4.32 MHz at a standard speed (single speed)). Recording marks having varying lengths of 9 kinds are written in the frame.

The test signal is reproduced by detecting the reflected light of a laser beam applied to these frames. A modulation factor m as an index of the amplitude of the reproduced signal is also measured.

$m = I11/Itop$

As showed in FIG. 7, I11 is the amplitude of a detected signal generated by an 11T recording mark and a land (the portion between recording marks), and I3 is the amplitude of a detected signal generated by a 3T recording mark and the land. Itop is a reflectivity of the land portion. The modulation factor m depends on the write power Pw.

When the write power is low, the modulation factor m is small because the amplitude of the reproduced signal is small. The greater the write power Pw becomes, the greater the amplitude of the reproduced signal becomes, and consequently, the greater the modulation factor m becomes. When the write power becomes greater to a sufficient extent, the modulation factor m saturates. If an optical disk is recorded at the write power Pw around which the modulation factor m begins saturating, the reproduced signal contains the least jitter and/or error. This write power is determined to be the optimum write power Pwo.

This optimum write power Pwo is used as the write power for the writing of signals. The optimum erase power Peo is determined based on the optimum write power Pwo by multiplying a coefficient εo (erase power/write power ratio) recorded in the optical disk as ATIP information.

$Peo = \epsilon o \times Pwo$

There are two methods of overwriting: a method in which a written signal is erased and then, a signal is written and a method in which a signal is directly overwritten (direct overwrite). Most optical disk drives available in the market utilize the direct overwrite method and few optical disk drives utilize the erase and write method. The direct overwrite method inherits the following problems.

Ordinarily, the write power that best fits the optical disk drive and the optical disk (medium) is determined by the OPC. If an appropriate signal amplitude (modulation factor), an overwrite property, and an appropriate erasing durability are taken into account when the optimum write power is determined, no problem would occur as long as the optical disk is written and read by the same optical disk drive.

However, the erasable optical disk such as a CD-RW disk is a compatible medium. The optical disk that is recorded by an optical disk drive manufactured by a manufacturer may be overwritten by an optical disk drive manufactured by another manufacturer. In this case, if the write power by which the signal is written in the optical disk is too high (the modulation factor is rather too high), the signal will remain un-erased depending on the erase power to be used during the overwriting.

That is, on the overwriting, laser power of two kinds, the write power to write a recording mark and the erase power to form a portion (space) where no recording mark exists, is applied to an existing recording region to perform the overwriting. In the case that the existing signal written on a track is too great, the existing signal is not erased and remains in the erased region (space region). It may cause a too low C/N ratio of the reproduced signal after the overwriting and a too high error rate.

If the write power and the erase power are equally increased to avoid this problem, the erasing durability of the optical disk is lowered and the life of the optical disk is shortened. Additionally, since the overwrite properties becomes worse if an optical disk recorded by an optical disk drive is further overwritten by another optical disk drive, the error rate of the reading of a signal becomes worse.

SUMMARY OF THE INVENTION

Accordingly, it is a general object of the present invention to provide a novel and useful optical disk drive in which one or more of the problems described above are eliminated.

Another and more specific object of the present invention is to provide an optical disk drive that performs the overwriting using an appropriate erase power to lower the reading error rate and not to shorten the life of the erasable optical disk.

An optical disk drive that records a signal in an optical disk and reproduces said signal from said optical disk by applying a laser beam to said optical disk, according to the present invention, includes detecting unit that evaluates quality of the reproduced signal during a writing operation, and power controlling unit that adjusts, during said writing operation, power of said laser beam applied to said optical disk in response to said quality of the reproduced signal evaluated by said detecting unit.

According to another aspect of the present invention, said detecting unit evaluates said quality of the reproduced signal by obtaining an erasing modulation factor using a peak value and a bottom value of said signal reproduced in a region of said optical disk, said region being erased during said writing operation, and said power controlling unit adjusts said power of said laser beam so that the obtained erasing modulation factor approaches a predetermined reference erasing modulation factor.

According to yet another aspect of the present invention, said detecting unit reproduces a signal prerecorded in said optical disk and evaluates quality of the reproduced prerecorded signal.

According to the present invention, the quality of the reproduced signal is evaluated during a writing operation, and the power of the laser beam is adjusted to the best value based on the evaluated signal quality. Even if marks have been overwritten with too excessive write power and/or have been overwritten off the track, for example, the optical disk drive according to the present invention can increase the erase power and certainly erase the marks. Accordingly, the optical disk drive can avoid an address error and record new marks correctly. Because the marks are recorded correctly, the optical disk drive can reduce the erase power required in an overwrite operation and extend the life of an optical disk.

To achieve one of the above objects, an optical disk drive that can overwrite a signal in an erasable optical disk, can include a controller that determines an optimum write power of said optical disk drive when said erasable optical disk is set in said optical disk drive, writes a test signal in a test area of said erasable optical disk using said optimum write power, and reproduces said test signal, wherein said controller further determines a reference erasing modulation factor by detecting a first peak value and a first bottom value of the test signal reproduced in a first region of said erasable optical disk, said first region being erased using an erase power, writes data signals in a recording area of said erasable optical disk, reproduces said data signals, obtains an erasing modulation factor by detecting a second peak value and a second bottom value of said data signals reproduced in a second region of said erasable optical disk, said second region being erased using said erase power, and adjusts said erase power so that said erasing modulation factor approaches said reference erasing modulation factor.

The optical disk drive obtains a reference erasing modulation factor using a test area of the erasable optical disk when the disk is set in the optical disk drive. While overwriting data signals in the erasable optical disk, the optical disk drive obtains an erasing modulation factor based on the reproduced signals of an erased region where the data signals are written, from time to time to adjust the erase power so that the erase power continually adjusted to the appropriate level.

If the erase power is too low, the erase power is increased up to the appropriate level so that the error rate of the reproduced data signal that is overwritten remains low. If the erase power is too high, the erase power is reduced down to the appropriate level so that the life of the erasable optical disk is not shortened.

Other objects, features, and advantages of the present invention will become more apparent from the following detailed description when read in conjunction with the accompanying drawings.

BRIEF DESCRIPTION OF THE DRAWINGS

FIGS. 2A and 2B are schematic drawings showing the wave forms of a sample pulse and a detected signal on the first recording, respectively, according to the embodiment showed in FIG. 1;

DETAILED DESCRIPTION OF THE PREFERRED EMBODIMENTS

Figure 1:
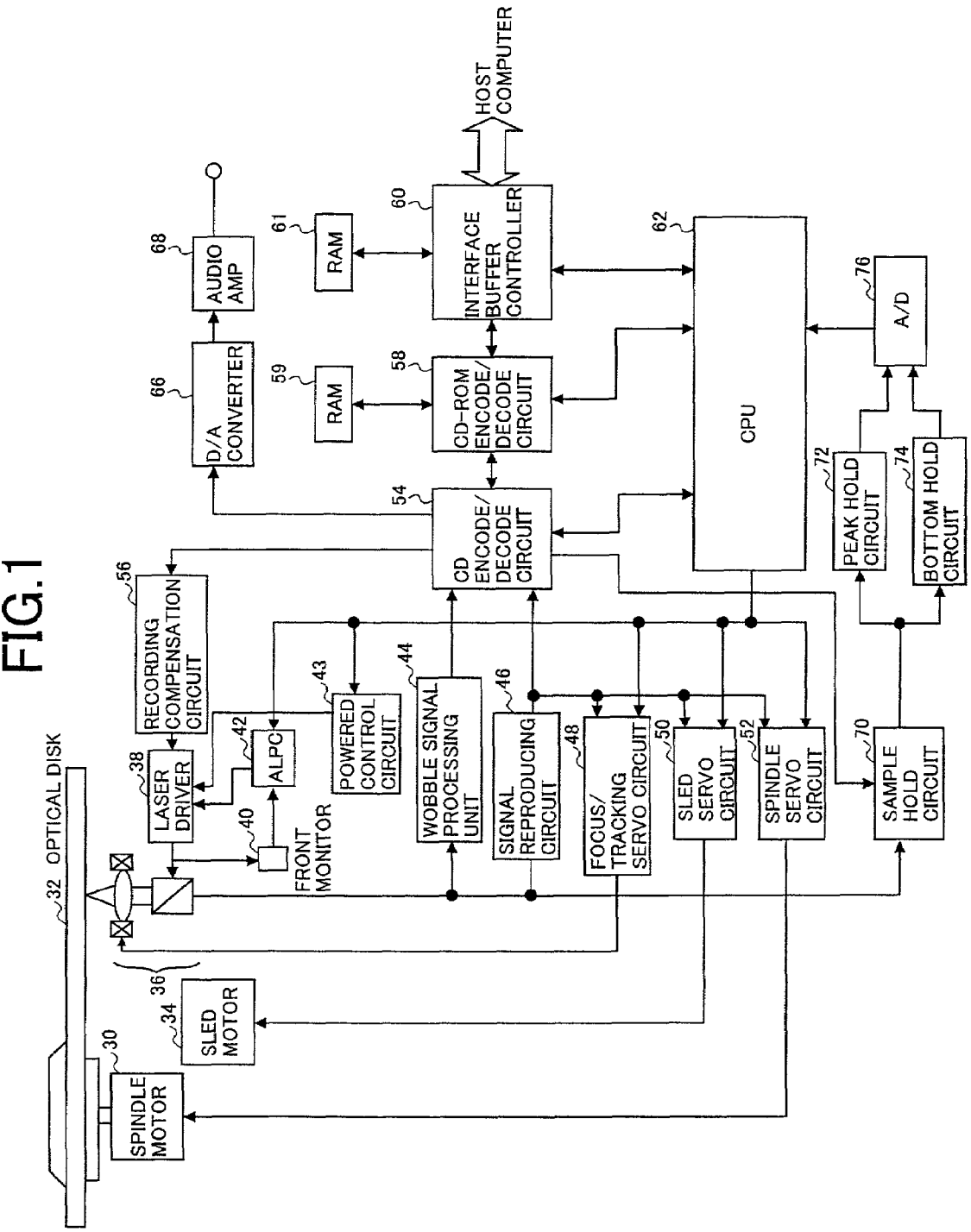
FIG. 1 is a block diagram showing the structure of an optical disk drive as the first embodiment of the present invention.

FIG. 1 is a block diagram showing the structure of an optical disk drive as the first embodiment of the present invention. A spindle motor 30 rotates an optical disk 32 at a predetermined rotational speed. A sled motor 34 actuates an optical pickup 36 in the radial direction of the optical disk 32. The optical pickup 36 consists of an optical system object lens, an actuator, a quarter wavelength plate, a collimator lens, a beam splitter, a light emitting component (a laser diode), and an optical detector, for example.

A laser driver 38 makes the laser diode emit a laser beam. A front monitor 40 detects and outputs the light power of the laser beam. ALPC (Automatic Laser Power Control) 42 is controlled by CPU 62 and controls the laser driver 38 so that the power of the laser beam becomes optimum based on the output of the front monitor 40.

A powered control circuit 43 obtains a powered emitting light quantity corresponding to a laser driver voltage based on the functional relationship between the powered emitting light quantity and a laser driver driving voltage obtained on the shipment from a manufacturing plant and superimposes the powered emitting light quantity on the write power of the write laser power.

A wobble signal processing unit 44 demodulates an ATIP signal. A pre-groove is provided on an erasable optical disk for the guiding. The pre-groove slightly wobbles in the radial direction at a center frequency of 22.05 kHz. Address information called ATIP (Absolute Time In Pre-groove) that is to be used on the writing is multiplexed by FSK modulation at a maximum shift of +/−1 kHz.

A signal reproduction circuit 46 amplifies, and reproduces, a reproduced signal provided from the optical pickup 36. This signal reproduction circuit 46 including a matrix amp separates various servo signals besides a main signal, and outputs the servo signals to respective servo circuits. A focus/tracking servo circuit 48 controls focus servo and tracking servo by actuating an actuator (not showed). A sled servo circuit 50 actuates and controls the sled motor 34. A spindle servo circuit 52 actuates and controls the spindle motor 30.

A CD encode/decode circuit 54 performs the encoding and decoding of CIRC (Cross Interleaved Read-solomon Code), the modulation and demodulation, and the sync detection. A recording compensation circuit 56 compensates the recorded data transferred by the CD encode/decode circuit 54 based on the writing properties of the medium. The amount of the compensation depends on the properties of the recording layer, the profile of the writing laser beam, and the linear speed of the writing.

A CD-ROM encode/decode circuit 58 performs the encoding and decoding of ECC (Error Correcting Code) unique to CD-ROM and the detection of a header. An interface/buffer controller 60 exchanges data with a host computer and controls a data buffer. RAMs 59 and 61 are secondary memories that temporarily store data therein before processing.

A sample hold circuit 70 recognizes the timing of the erase power (space) based on the write data provided by the CD encode/decode circuit 54, and samples the signal detected from the reflected light by the optical pickup 36 during the timing of the erase power. The detected signal is obtained by adding photoelectric conversion signals detected by half-split photo detecting face. The detected signal is the reproduced signal itself during the reproducing.

Figure 3A:
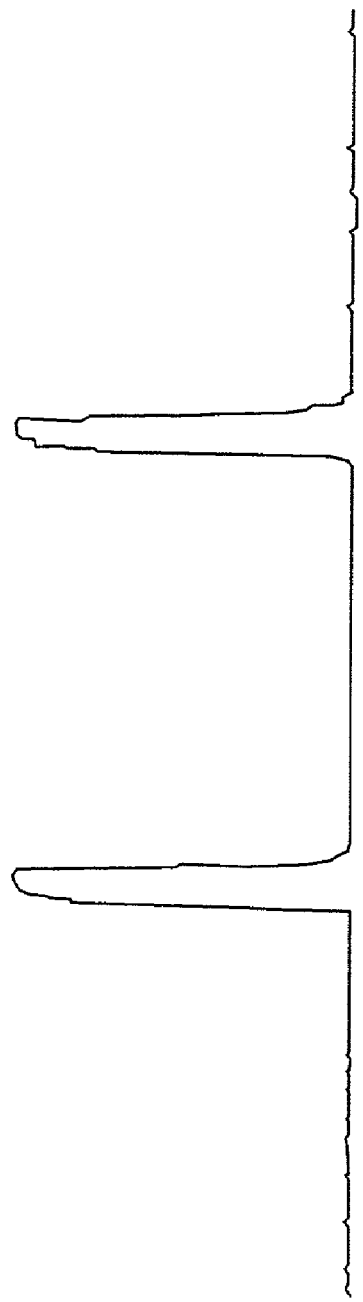
FIGS. 3A and 3B are schematic drawings showing the wave forms of a sample pulse and a detected signal on the overwriting, respectively, according to the embodiment showed in FIG. 1.
Figure 3B:
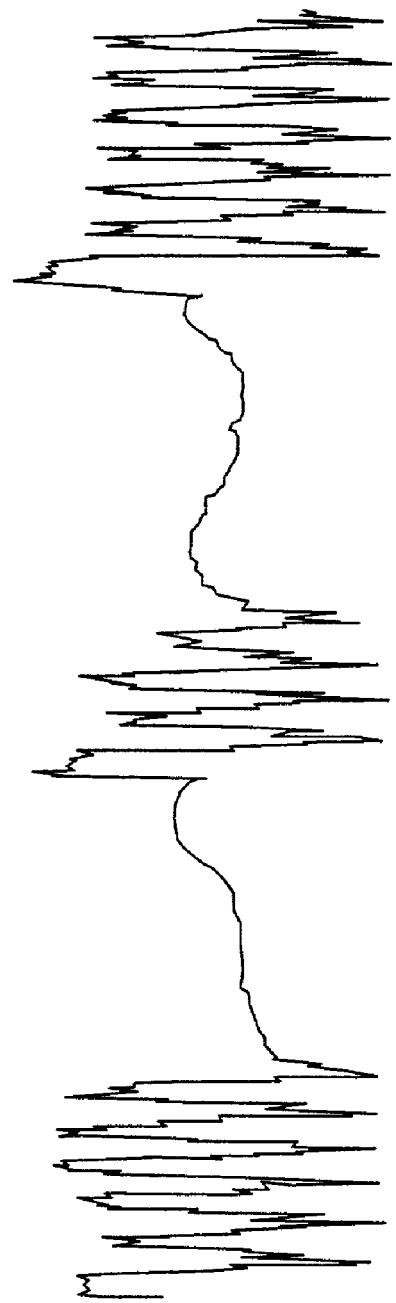

FIGS. 2A and 2B show the wave forms of a sample pulse (in the erase power timing) of the first writing and a signal (the detected signal is obtained by adding photoelectric conversion signals detected by half-split photo detecting face and is the reproduced signal itself during the reproducing) detected from the reflected light by the optical pickup 36, respectively. FIGS. 3A and 3B show the wave forms of the sample pulse of the overwriting and the detected signal, respectively.

A peak hold circuit 72 holds the peak level (maximum value) of the detected signal provided by the sample hold circuit 70. A bottom hold circuit 74 holds the bottom level (minimum value) of the detected signal provided by the sample hold circuit 70. The above peak level and bottom level are digitized by an A/D converter 76 and provided to CPU 62.

That is, the peak level and the bottom level that are sampled at the timing of the erase power are provided to CPU 62. CPU 62 obtains an erasing modulation factor mw based on the peak level (P) and the bottom level (B) at the timing of the erase power timing, where $$mw=(P-B)/P.$$

CPU 62 is a microcomputer that controls the entire system of this optical disk drive, that is, a CD-R/RW drive, including a mechanical operation. CPU 62 itself includes memories (ROM, RAM, and nonvolatile RAM). A D/A converter 66 converts audio data transferred from the CD encode/decode circuit 58 into an analog signal. An audio amp 68 amplifies and outputs the audio signal converted from the audio data.

CPU 62 further controls ALPC 42 in the case where the erase power and the write power need to be changed. A table indicating the percentage increase y (%) of the erase write power ratio ε (=erase power/write power) corresponding to the percentage increase x (%) of the modulation factor is stored in the memory (ROM) of CPU 62 beforehand.

Figure 4:
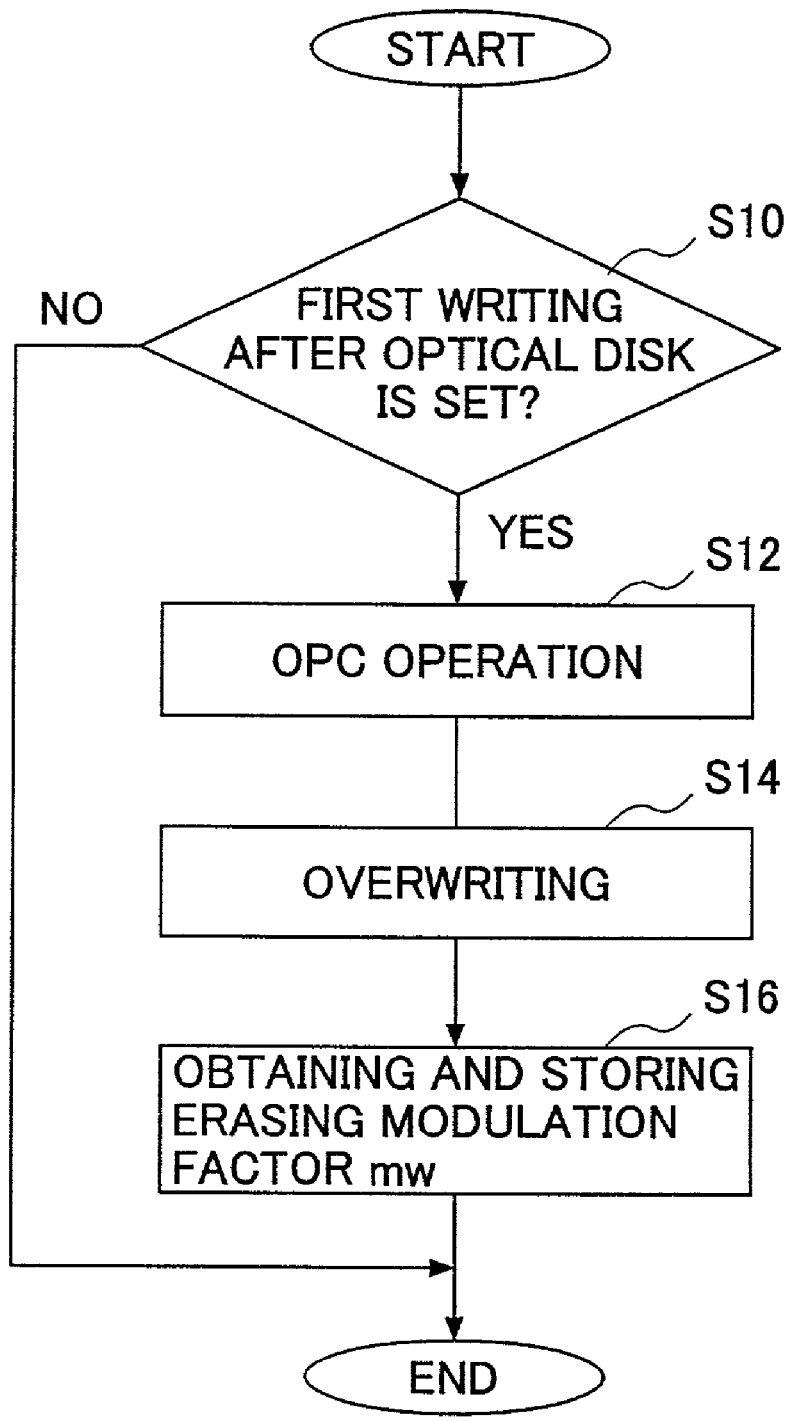
FIG. 4 is a flow diagram showing OPC operation processing as an embodiment of the present invention.

FIG. 4 shows a flow diagram of OPC operation processing performed by CPU 62 as an embodiment of the present invention.

In FIG. 4, CPU 62 determines whether the writing operation is the first writing operation after an optical disk is set (Step S10). If the writing operation is the first writing operation, CPU 62 performs an OPC operation where the optimum write power is determined by writing a test signal using a laser power of 15 steps in a partition consisting of 15 frames provided in the test area of PCA, each frame recorded with a laser power of a step (Step S12). Then, in another partition of the test area, the writing using the optimum write power is performed, and then, the overwriting using the optimum write power is further performed (Step S14). An erasing modulation factor mw (the average of 15 frames) of the erased region after the overwriting is performed is calculated. This erasing modulation factor mw is stored in the embedded memory (nonvolatile RAM) of CPU 62 as a reference erasing modulation factor mwo (Step S16).

It is possible, in step S14, to perform the overwriting to one of frames in the count area of PCA, instead of another partition. In this case, the extra consumption of the test area is avoided and the time required for the overwriting is shortened. However, the accuracy of the erasing modulation factor mw is reduced since the erasing modulation factor mw is calculated using only one frame.

Figure 5:
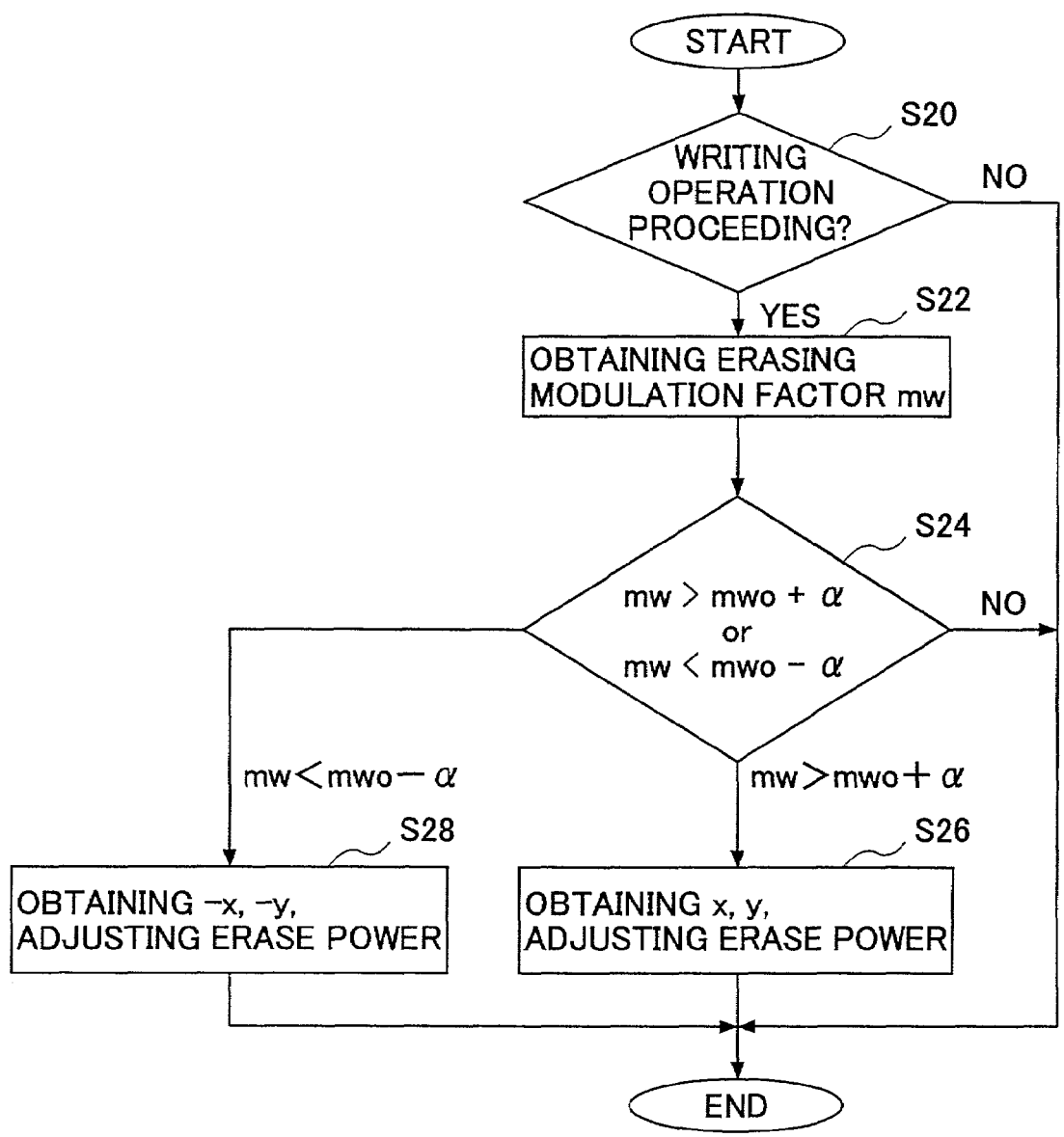
FIG. 5 is a flow diagram showing running OPC operation processing as an embodiment of the present invention.
Figure 6:
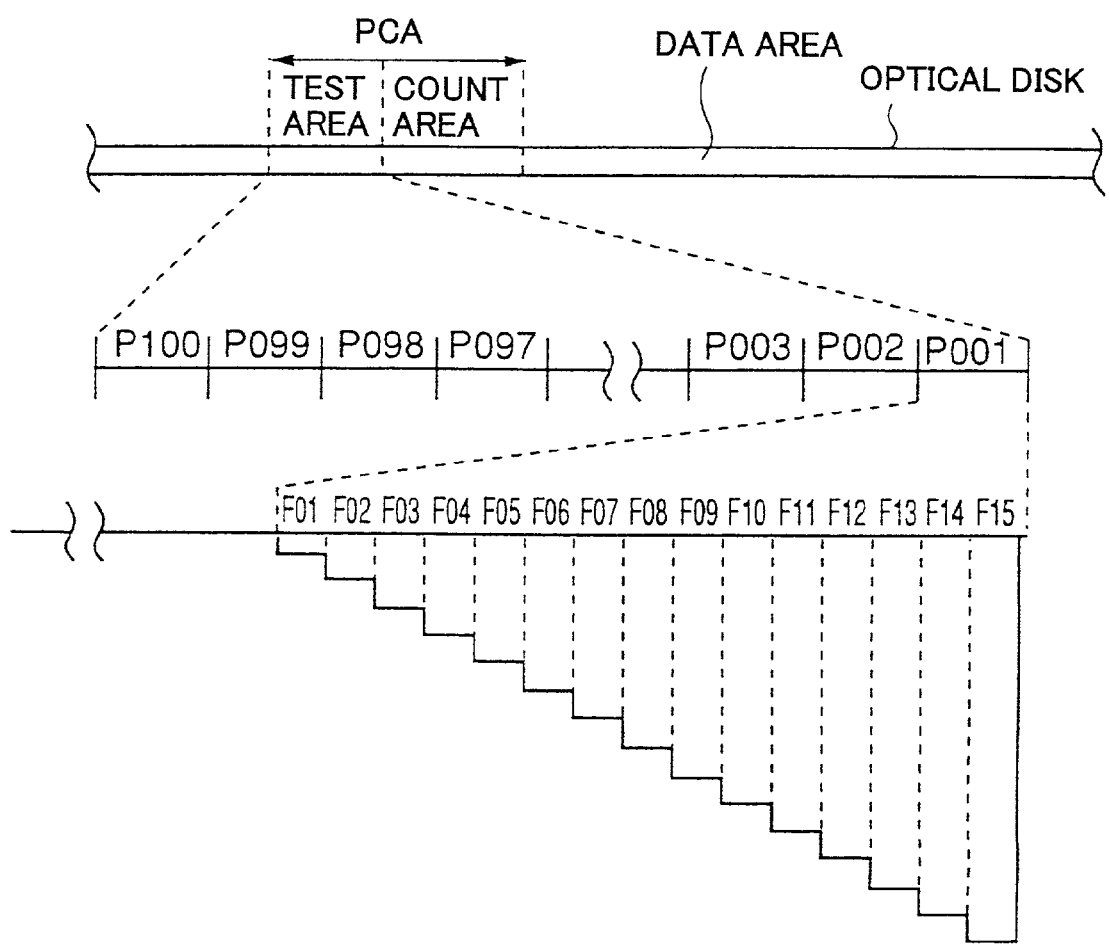
FIG. 6 is a schematic drawing showing the test recording region of an optical disk.
Figure 7:
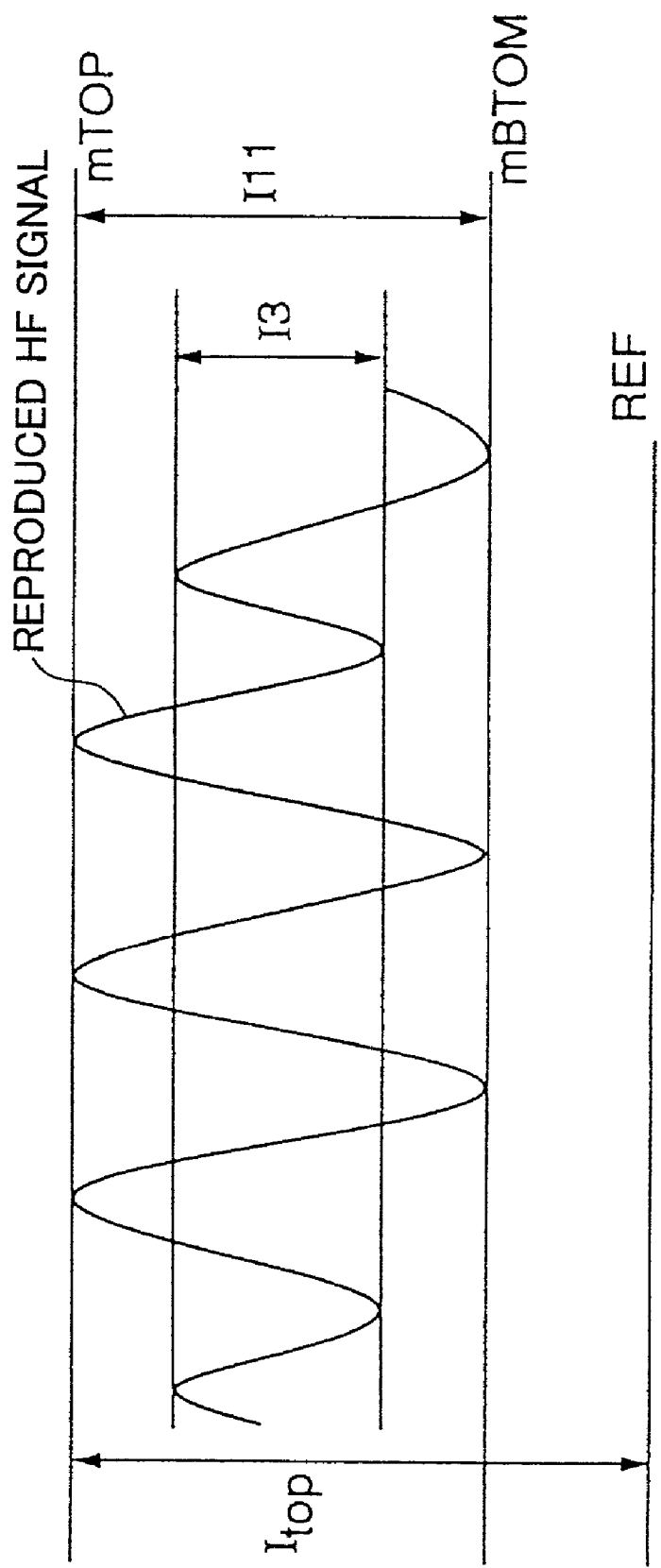
FIG. 7 is a schematic drawing showing how the modulation factor m is obtained.

FIG. 5 shows a flow diagram of running OPC operation processing performed by CPU 62 as an embodiment of the present invention. The running OPC is an operation in which, during the writing of information, the quantity of the light reflected from the recording mark is compared with the quantity of the light reflected from the recording mark written during the above OPC operation using the optimum write power and, based on the result of the comparison, the current write power is adjusted from time to time based on the optimum write power obtained during the OPC operation as a target.

As shown in FIG. 5, CPU 62 determines whether the writing operation is proceeding (Step S20). If the writing operation is proceeding, CPU 62 calculates the erasing modulation factor mw of the erased region in the writing portion (Step S22). This erasing modulation factor mw is compared with the reference erasing modulation factor mwo stored in the embedded memory (nonvolatile memory) of CPU 62 (Step S24). If mw>mwo+α, the increment x of the erasing modulation factor mw to the reference erasing modulation factor mwo is determined and the increment y of the erase/write power ratio corresponding to the above increment x of the modulation factor is obtained from the table registered in the memory (ROM) of CPU 62. The erase power is adjusted by the new value obtained from the increment y of the erase/write power ratio and the current write power (Step S26).

On the other hand, if mw<mwo−α, the increment −x of the erasing modulation factor mw to the reference erasing modulation factor mwo is determined and the increment −y of the erase/write power ratio corresponding to the above increment −x of the modulation factor is obtained from the table registered in the memory (ROM) of CPU 62. The erase power is adjusted by the new value obtained from the increment −y of the erase/write power ratio and the current write power (Step S28). The adjustment of the erase power is performed by controlling ALPC by CPU 62.

Accordingly, if the erase power is too low, the erase power is increased to an appropriate level to keep the error rate of the reading of the overwritten portion low enough. If the erase power is too high, the erase power is reduced to an appropriate level not to shorten the life of the erasable optical disk.

In the embodiment described above, the erase power is adjusted based on the erasing modulation factor mw. The erase power may be adjusted based on the number of errors occurring during the write operation.

Figure 8:
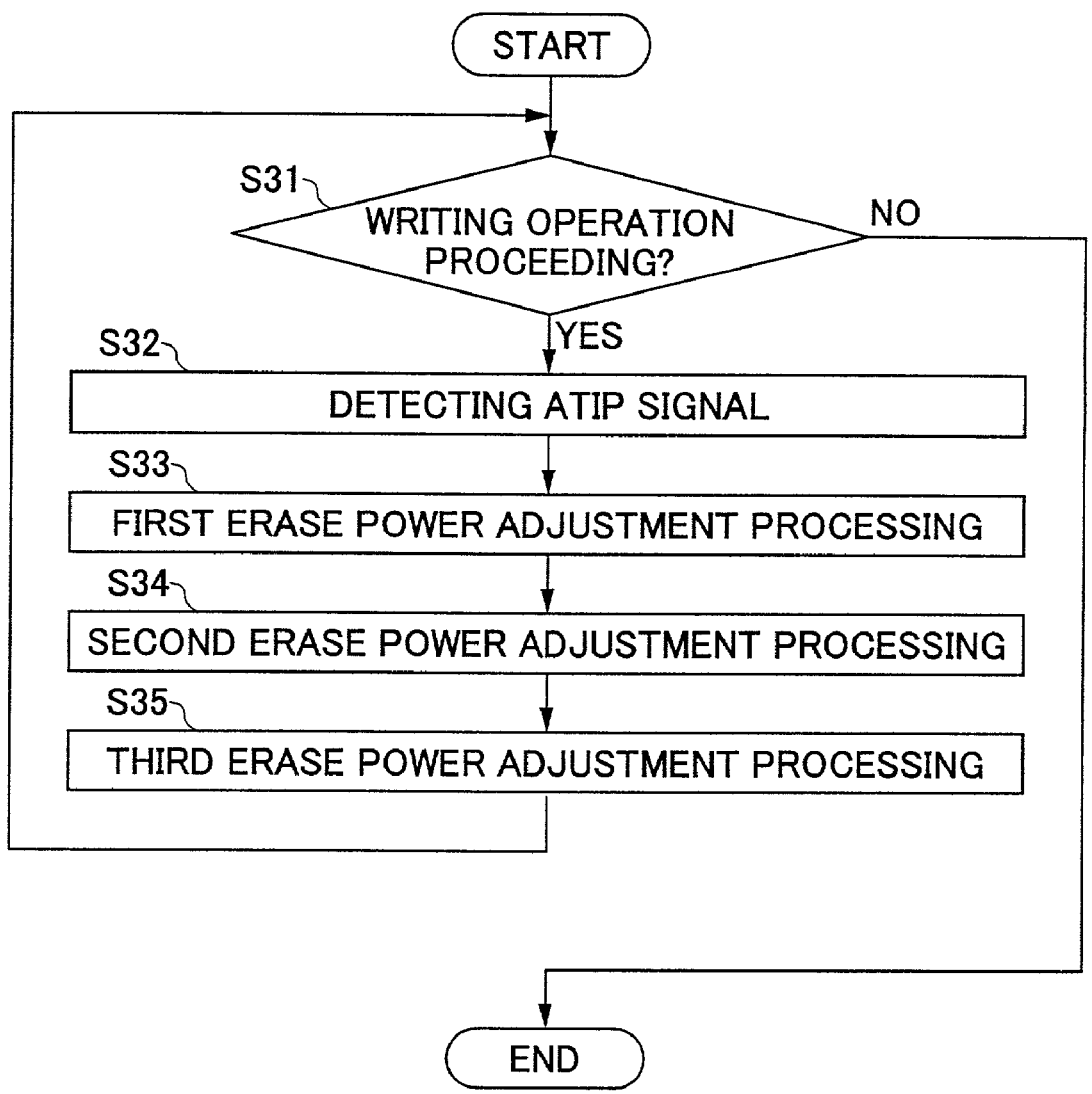
FIG. 8 is a flow diagram showing erase power adjustment processing as the second embodiment of the present invention.

FIG. 8 is a flow diagram showing how to adjust the erase power as the second embodiment of the present invention.

Since the structure of an optical disk drive according to this embodiment is the same as that showed in FIG. 1, the explanation of the structure is omitted.

In this embodiment, the erase power is adjusted while the write operation is proceeding.

CPU 62 first determines whether the write operation is proceeding (Step S31). If CPU 62 determines in step S31 that the write operation is not proceeding, CPU 62 does not adjust the write power. If CPU 62 determines in step S31 that the write operation is proceeding, CPU 62 detects an ATIP signal (Step S32).

CPU 62 performs the first erase power adjustment based on the ATIP signal (Step S33), and further performs the second erase power adjustment (Step S34) and the third erase power adjustment (Step S35). The erase power is set at the reference erase power every time the write operation starts. The reference erase power is the erase power determined beforehand by the OPC process when the medium is set in the drive.

The first erase power adjustment will be explained below in detail. The first erase power adjustment is a process where the erase power is adjusted based on the result of the cyclic redundancy check (CRC) in the ATIP signal.

Figure 9:
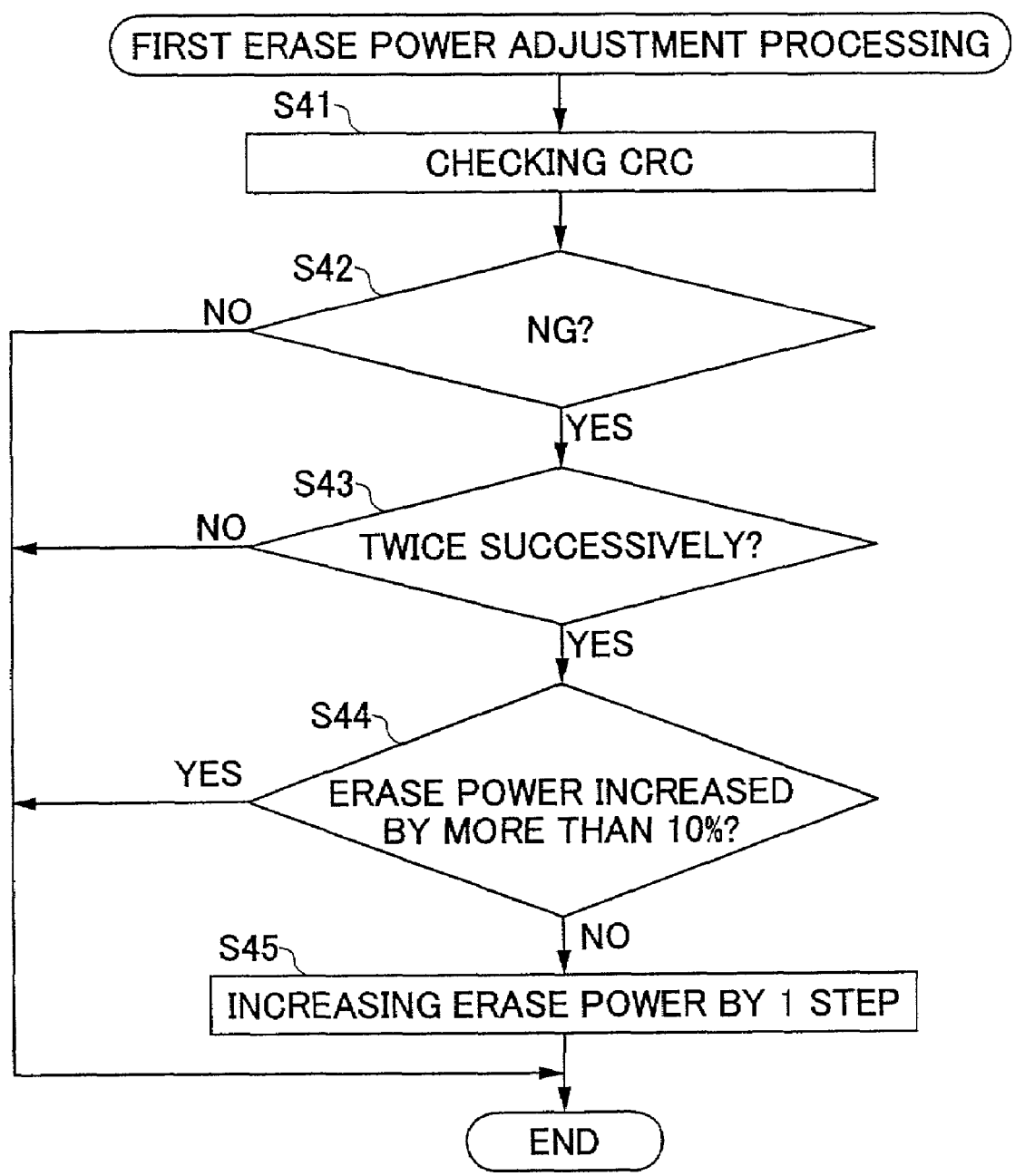
FIG. 9 is a flow diagram showing the first erase power adjustment processing.

FIG. 9 is a flow diagram showing the first erase power adjustment.

CPU 62 performs the CRC check (Step S41). Next, CPU 62 determines whether the result of the CRC check is "NG" or "OK" (Step S42).

If the result of the CRC check is "NG" in step S42, CPU 62 determines whether the result of the CRC check has been "NG" twice consecutively (Step S43). The result of this determination is used to evaluate the signal quality. CPU 62 finishes the first erase power adjustment if the result of the CRC check is not "NG" twice consecutively.

If the result of the CRC has been "NG" twice consecutively, CPU 62 determines whether the erase power is greater than the reference erase power by up to 10% (Step S44).

If the erase power is greater than the reference erase power by more than 10% in step S44, CPU 62 finishes the first erase power adjustment. If the increase in the erase power is not greater than 10% of the reference erase power in step S44, CPU 62 increases the erase power by 1 step (Step S45). The step increase in the erase power is set at 2% of the reference erase power so that the increase in the erase power is not greater than 10% of the reference erase power.

As described above, the signal quality is determined based on the result of the CRC check. If the signal quality is bad, the erase power is increased.

The second erase power adjustment will be explained next. The second erase power adjustment is performed based on the error in address of an ATIP signal.

Figure 10:
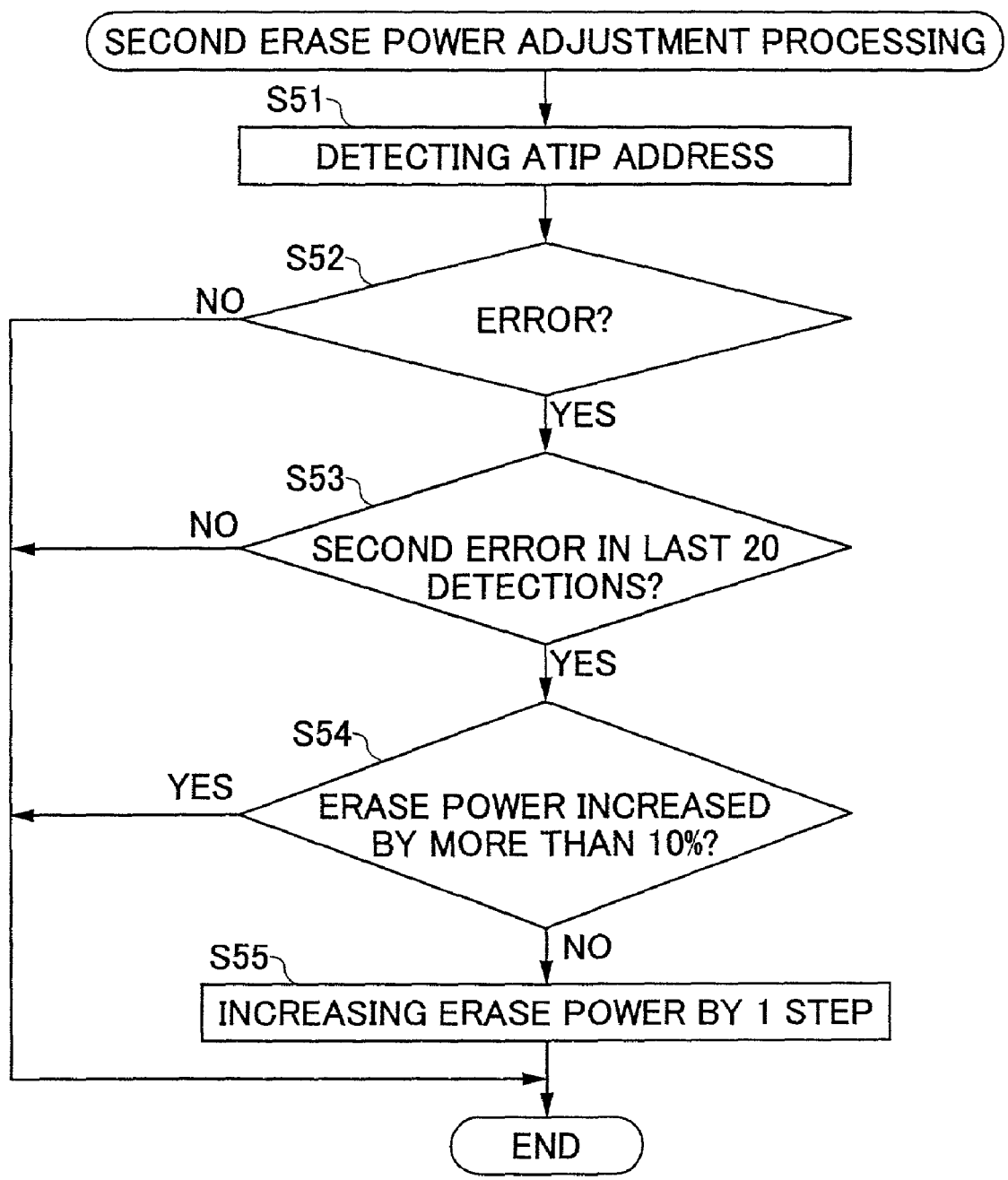
FIG. 10 is a flow diagram showing the second erase power adjustment processing.

FIG. 10 is a flow diagram showing the second erase power adjustment.

CPU 62 detects an ATIP address (Step S51). Next, CPU 62 determines whether the result of the ATIP address detection is "error" (Step S52). If CPU 62 determines that the ATIP address detected in step S52 is normal, CPU 62 finishes the second erase power adjustment.

If CPU 62 determines that the detection of the ATIP address is an "error" in step S52, CPU 62 further determines whether the detection of "error" is the second one in the last 20 detections (Step S53). This decision corresponds to the evaluation of the signal quality. Based on this decision result, CPU 62 determines whether the error rate of the ATIP address is 10%.

If this detection of an error is not the second one in the last 20 detections of the ATIP address, CPU 62 finishes the second erase power adjustment. If "NG" is detected twice consecutively in step S53, CPU 62 determines whether the increase in the erase power is more than 10% of the reference erase power (Step S54).

If CPU 62 determines that the increase in the erase power is greater than 10% of the reference erase power in step S54, CPU 62 finishes the second erase power adjustment. If CPU 62 determines that the increase in the erase power is not greater than 10% of the reference erase power in step S54, CPU 62 increases the erase power by 1 step (Step S55). The step increase in the erase power is set at 2% of the reference erase power based on an assumption that the maximum number of consecutive occurrence of errors is set at 10, for example.

The signal quality is determined based on the detection of the ATIP address and, if the signal quality is not good, the erase power is increased. The erase power is adjusted in the same manner as the first embodiment.

The third erase power adjustment will be described next. In the third erase power adjustment, the erase power is adjusted based on the detection of the sync in the ATIP signal.

Figure 11:
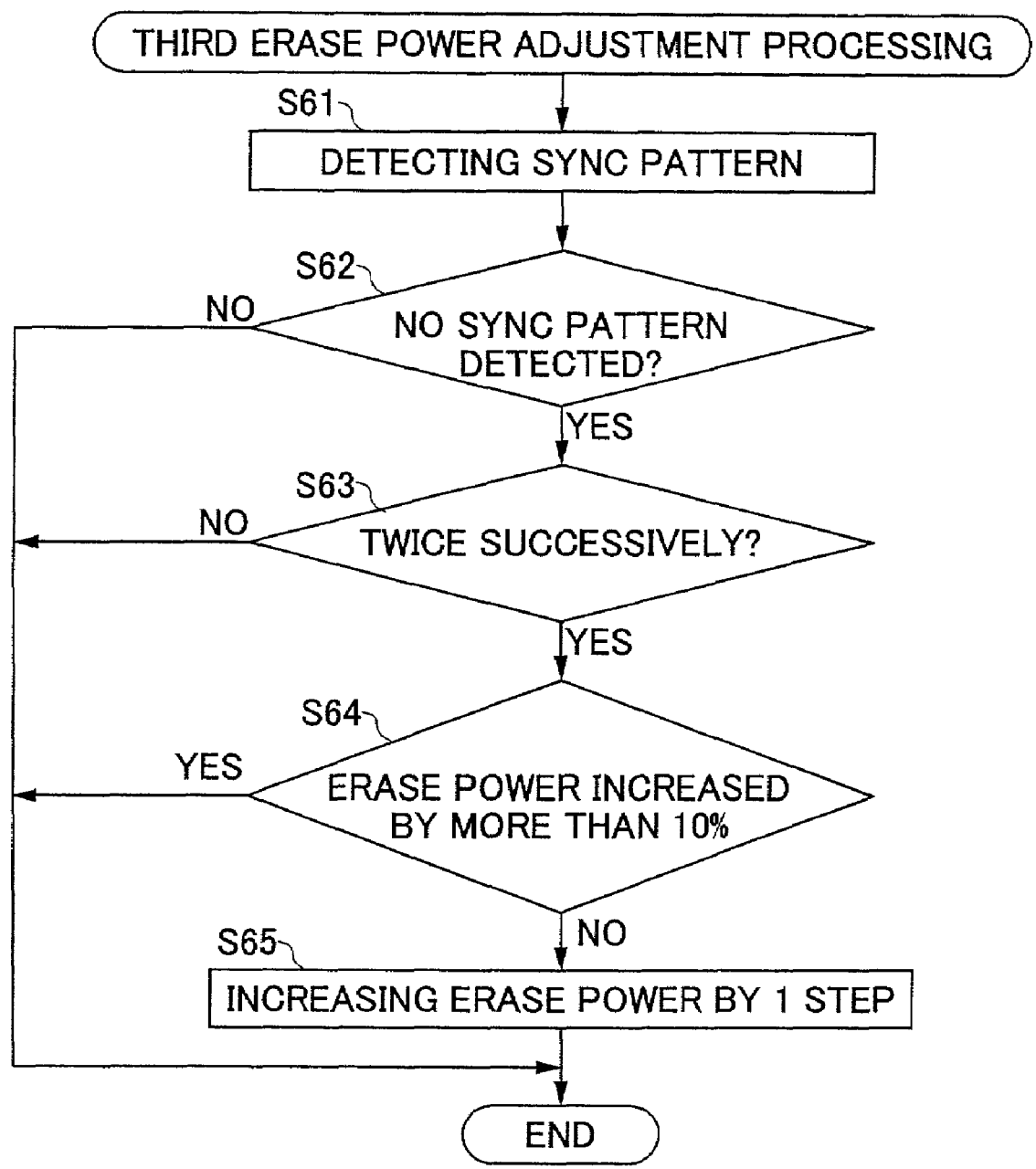
FIG. 11 is a flow diagram showing the third erase power adjustment processing.

FIG. 11 is a flow diagram showing the third erase power adjustment.

CPU 62 detects the sync pattern (Step S61). CPU 62 determines whether the sync pattern is detected (Step S62).

If the sync pattern is detected normally in step S62, CPU 62 finishes the third erase power adjustment. If the sync pattern is not detected in step S62, CPU 62 determines whether the sync pattern has not been detected twice consecutively (Step S63).

If CPU 62 determines that the detection did not fail twice consecutively in step S63, CPU 62 finishes the third erase power adjustment. If CPU 62 determines that the detection of the sync pattern failed twice consecutively in step S63, CPU 62 further determines whether the increase in the erase power is greater than 10% of the reference erase power (Step S64).

If CPU determines that the increase in the erase power is greater than 10% of the reference erase power in step S64, CPU 62 finishes the third erase power adjustment. If the increase in the erase power is not greater than 10% of the reference erase power, CPU 62 increases the erase power by 1 step (Step S65).

As described above, the signal quality is determined based on the detection of the sync pattern and, if the signal quality is not good, the erase power is increased.

In the first erase power adjustment, the erase power is increased by 1 step if the result of the CRC check is "NG" twice consecutively. The erase power, however, may be increased by 1 step on condition that the CRC check is "NG"

for the second time in the last 20 detections in the same manner as the ATIP address. In the second erase power adjustment, the erase power is increased by 1 step if an error is detected for the second time in the last 20 detections. The erase power, however, may be increased by 1 step on condition that an error is detected twice consecutively in the same manner as the sync pattern. Furthermore, in the third erase power adjustment, the erase power is increased by 1 step if the sync pattern is not detected twice consecutively. The erase power, however, may be increased by 1 step on condition that the sync pattern is not detected for the second time in the last 20 detection in the same manner as the ATIP address.

In this embodiment, though the erase power is adjusted based on the quality of the ATIP signal, the erase power may be adjusted based on the quality of the wobble signal.

Figure 12:
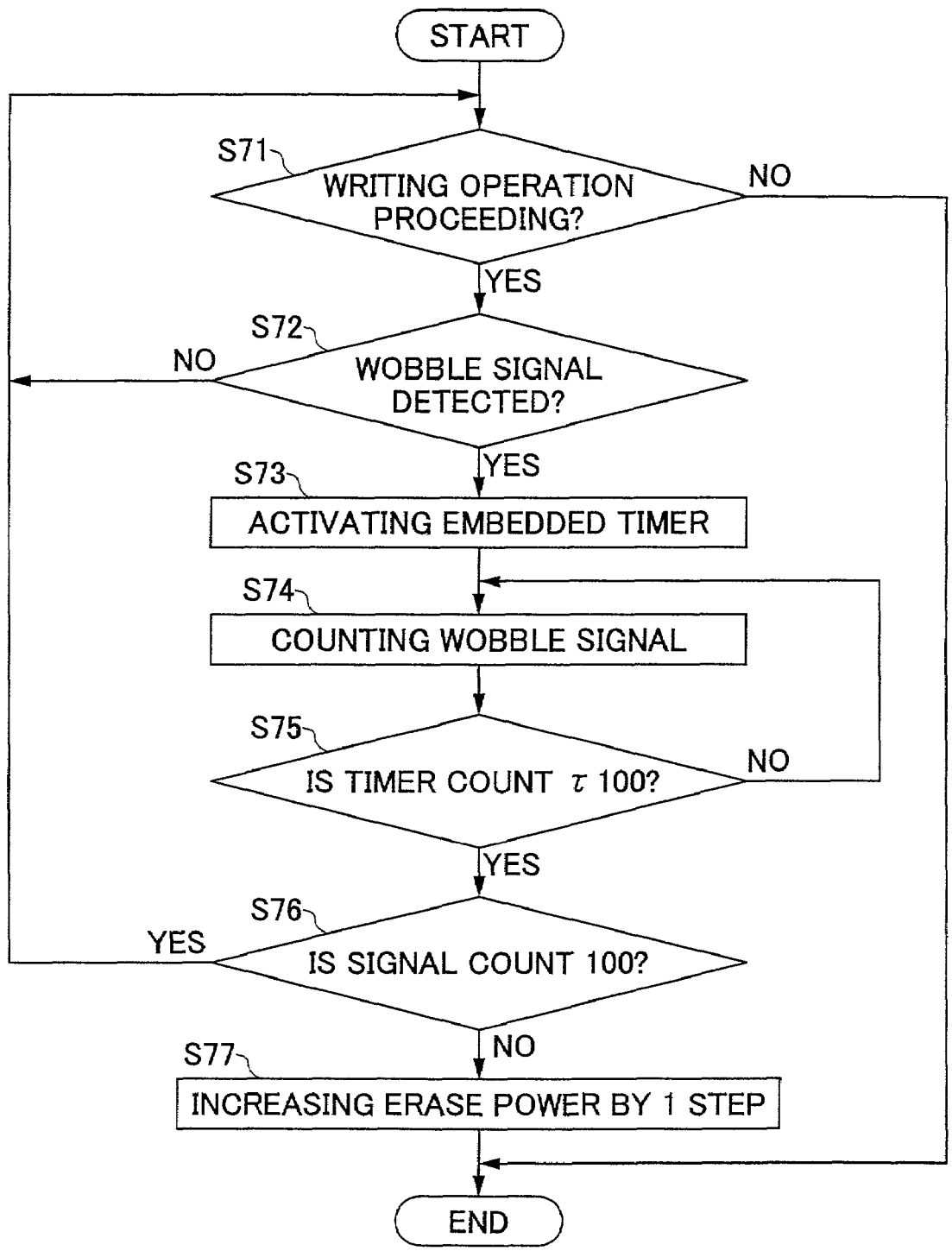
FIG. 12 is a flow diagram showing erase power adjustment processing as the third embodiment of the present invention.

FIG. 12 is a flow diagram showing an erase power adjustment as the third embodiment of the present invention.

Because the structure of this embodiment is equivalent to the structure showed in FIG. 1, the explanation of the structure is omitted.

CPU 62 is provided with a binary-digitized wobble signal. CPU 62 determines whether the write operation is proceeding (Step S71). If CPU 62 determines that the write operation is not proceeding in step S71, CPU 62 does not adjust the erase power. If CPU 62 determines that the write operation is proceeding in step S71, CPU 62 further determines whether a binary-digitized wobble signal is detected (Step S72). If CPU 62 determines that the binary-digitized wobble signal is detected in step S72, CPU 62 activates an embedded timer (Step S73).

After activating the timer, CPU 62 counts the binary-digitized wobble signal (Step S74). CPU 62 determines whether the time count of the embedded timer reaches the time period τ100 of 100 pulse cycles of the wobble signal (Step S75). In step S74, CPU 62 keeps counting until the time count of the embedded timer reaches the time period τ100 of 100 pulse cycles of the binary-digitized wobble signal.

In the case that the write operation is performed at single speed, the frequency fw0 of the wobble signal is 22.05 kHz. The cycle time τ0 is 45.3 μs. The cycle time τ100 of 100 pulses of the binary-digitized wobble signal is $$\tau 100 = 100 \times \tau 0 = 453 \text{ μs}.$$

Accordingly, if the quality of the wobble signal is good, the pulse count would be 100 during 453 μm.

CPU 62 determines whether the pulse count of the wobble signal falls in the range of 96-104 when the time count of the embedded timer reaches the cycle time τ100 of 100 pulses of the wobble signal in step S75 (Step S76). If the pulse count of the wobble signal falls in the range of 96-104 in step S76, CPU 62 determines that the quality of the wobble signal is good enough and keeps performing the write operation.

If the pulse count of the wobble signal does not fall in the range of 96-104 in step S76, CPU 62 determines that the quality of the wobble signal is not good and increases the erase power by 1 step (Step S77).

In this embodiment, the signal quality is evaluated based on whether the cycle time τ of the binary-digitized wobble signal equals to a predetermined cycle time. The signal quality of the wobble signal may be evaluated by detecting chattering contained in the wobble signal. The signal quality is determined to be worse if more chattering is contained in the signal, and the signal quality is determined to be better if less chattering is contained in the signal.

Since the chattering is usually eliminated before it is provided to CPU 62, the chattering must be detected before it is eliminated in this case.

The wobble signal containing the chattering is transformed into pulses and the edges of the pulses are counted. It is determined that, if the edge count is more, there is more chattering, and if the edge count is less, there is less chattering. The signal quality is evaluated based on this edge count. If the signal quality is not good, that is, more edges are counted than a predetermined edge count, the erase power is increased by 1 step.

According to the embodiment described above, since the erase power is adjusted based on the signal quality during the write operation, the erase power is increased and data to be erased are certainly erased even if the marks of the data are overwritten by an excessive write power or located off-track. Accordingly, the optical disk drive according to the present invention can certainly overwrite new marks without causing an address error.

In the above embodiments, the erase power is increased after detecting the state of the recording medium based on the signal quality during the write operation so as not to set the erase power unnecessarily high. Accordingly, the recording medium is not damaged in the write operation and the overwrite durability is improved.

In the above embodiments, when an error is detected, the erase power is increased step by step from the reference erase power. The erase power, however, may be increased up to the maximum erase power at first, and then, the erase power may be reduced step by step unless an error is not detected.

In the above embodiments, only the erase power is adjusted, but the write power may be adjusted in addition to the erase power at the same time.

In summary, according to the present invention, the quality of the reproduced signal is evaluated during a writing operation, and the power of the laser beam is adjusted to the best value based on the evaluated signal quality. Even if marks have been overwritten with too excessive write power and/or have been overwritten off the track, for example, the optical disk drive according to the present invention can increase the erase power and certainly erase the marks. Accordingly, the optical disk drive can avoid an address error and record new marks correctly. Because the marks are recorded correctly, the optical disk drive can reduce the erase power required in an overwrite operation and extend the life of an optical disk.

If the erase power is too low, the erase power is increased up to the appropriate level so that the error rate of the reproduced data signal that is overwritten remains low. If the erase power is too high, the erase power is reduced down to the appropriate level so that the life of the erasable optical disk is not shortened.

The preferred embodiments of the present invention are described above. The present invention is not limited to these embodiments, but various variations and modifications may be made without departing from the scope of the present invention.

This patent application is based on Japanese priority patent applications No. 2001-151482 filed on May 21, 2001 and No. 2002-109820 filed on Apr. 11, 2002, the entire contents of which are hereby incorporated by reference.

What is claimed is:

1. An optical disk drive that records a signal to and/or reproduces a signal from an optical disk by applying a laser beam, comprising:

a detecting unit configured to evaluate the quality of the signal recorded in a data region formed during a running OPC operation within a recording operation wherein actual recording data is written on the optical disk; and a power controlling unit configured to control the power of the laser beam applied to the optical disk based on the evaluation result of the signal quality by said detecting unit during the recording operation;

wherein said detecting unit evaluates the quality of the signal recorded in said data region based on a comparison between an erasing modulation factor derived from the peak and bottom values of detected reflective light from any erased space or spaces in said data region erased with erase power and a pre-established reference erasing modulation factor.

2. The optical disk drive as claimed in claim 1, wherein said power controlling unit adjusts the recording power of the laser beam so that the derived erasing modulation factor approaches the predetermined reference erasing modulation factor.

3. The optical disk drive as claimed in claim 1, further comprising an OPC unit configured to write test data in a test recording region of the optical disk distinct from said data region, the power of the laser beam being varied, and determine an optimum write power by reproducing a signal from the test recording region of the optical disk, when the optical disk is set in the optical disk drive:

wherein said OPC unit forms said pre-established reference erasing modulation factor by overwriting test data in said test region of said optical disk with the determined optimum write power and detecting reflective light from a region in the test-data-overwritten test region, the region being erased with the erase power.

4. A method of controlling the power of a laser beam during a running OPC operation in a recording operation wherein recording data is written in a data region of an optical disk, the method comprising:

storing a predetermined reference erasing modulation factor in memory;

locating an erased space in said data region which has been erased with erase power;

detecting reflective light from said erased space and determining deriving an erasing modulation factor from the detected peak and bottom of the reflected light;

comparing the derived erasing modulation factor to the predetermined reference erasing modulation factor stored in memory;

evaluating, during the recording operation, the quality of the signals recorded to the optical disk in said data region of the optical disk, based on the comparison between the derived erasing modulation factor and the predetermined reference erasing modulation factor; and controlling, during the recording operation, the power of a laser beam applied to the optical disk based on the evaluation result of the quality of the signal recorded to the optical disk in said data region of the optical disk.

* * * * *